(12) United States Patent
Wakashima (10) Patent No.: US 11,551,872 B2
(45) Date of Patent: Jan. 10, 2023

(54) MULTILAYER CERAMIC CAPACITOR

(71) Applicant: Murata Manufacturing Co., Ltd., Nagaokakyo (JP)

(72) Inventor: Masahiro Wakashima, Nagaokakyo (JP)

(73) Assignee: MURATA MANUFACTURING CO., LTD., Kyoto (JP)

(\*) Notice: Subject to any disclaimer, the term of this patent is extended or adjusted under 35 U.S.C. 154(b) by 49 days.

(21) Appl. No.: 16/809,614

(22) Filed: Mar. 5, 2020

(65) Prior Publication Data

US 2020/0312561 A1 Oct. 1, 2020

(30) Foreign Application Priority Data

Mar. 29, 2019 (JP) .............................. JP2019-068291

(51) Int. Cl.
*H01G 4/008* (2006.01)
*H01G 4/12* (2006.01)
(Continued)

(52) U.S. Cl.
CPC ......... *H01G 4/2325* (2013.01); *H01G 4/0085* (2013.01); *H01G 4/1227* (2013.01); *H01G 4/30* (2013.01)

(58) Field of Classification Search
CPC .......... H01C 1/148; H01C 7/008; H01C 7/18; H01F 17/0013; H01F 27/2804;
(Continued)

(56) References Cited

U.S. PATENT DOCUMENTS 4,982,485 A \* 1/1991 Nakaya ................ H01G 4/2325
29/25.42
2011/0141655 A1\* 6/2011 Jeong ..................... H01G 4/005
361/306.3
(Continued)

FOREIGN PATENT DOCUMENTS

JP 04-260314 A 9/1992
JP 10-135073 A 5/1998
(Continued)

OTHER PUBLICATIONS

Dfficial Communication issued in corresponding Japanese Patent Application No. 2019-068291, dated Nov. 16, 2021.

*Primary Examiner* — Timothy J Thompson
*Assistant Examiner* — Guillermo J Egoavil
(74) *Attorney, Agent, or Firm* — Keating & Bennett, LLP (57) ABSTRACT

A multilayer ceramic capacitor includes a capacitive element including a ceramic layer, a first internal electrode layer, and a second internal electrode layer, the capacitive element including a first and second principal surfaces, first and second side surfaces, and first and second end surfaces. The first and second internal electrode layers respectively extend to the first and second end surfaces, at least a portion of each of the first and second end surfaces are covered with a conductor layer, a portion of the conductor layer is covered with an insulating portion, at least a portion of the conductor layer and at least a portion of the insulating portion are covered with the underlayer external electrode layer when viewed from the first end surface and the second end surface, and at least a portion of the underlayer external electrode layer is covered with a plating layer.

20 Claims, 7 Drawing Sheets

(51) Int. Cl.
*H01G 4/232* (2006.01)
*H01G 4/30* (2006.01)

(58) Field of Classification Search
CPC .......... H01F 27/292; H01F 2027/2809; H01G 4/1227; H01G 4/232; H01G 4/2325; H01G 4/30; H01G 4/008; H01G 4/12; H01G 4/1245; H01G 4/248; H01G 4/308; H01L 41/0471; H01L 41/0472; H01L 41/1876; H01L 41/293; H01L 41/297
USPC ......... 361/306.3, 301.4, 321.4, 321.2, 321.5; 174/260
See application file for complete search history.

(56) References Cited

U.S. PATENT DOCUMENTS

| | | | |
|---|---|---|---|
| 2014/0116766 A1* | 5/2014 | Jeon | H01G 2/065 |
| | | | 174/260 |
| 2016/0099111 A1* | 4/2016 | Ito | H01G 4/12 |
| | | | 361/301.4 |
| 2017/0011852 A1* | 1/2017 | Miyazaki | H01G 4/30 |
| 2017/0263383 A1* | 9/2017 | Kageyama | H01L 41/297 |
| 2018/0151298 A1* | 5/2018 | Kim | H01G 4/002 |
| 2018/0190433 A1* | 7/2018 | Cho | H01G 4/232 |
| 2019/0013150 A1* | 1/2019 | Koo | H01G 4/2325 |
| 2019/0131076 A1* | 5/2019 | Fukumura | H01G 4/232 |

FOREIGN PATENT DOCUMENTS

| | | | | |
|---|---|---|---|---|
| JP | 2006-332284 A | | 12/2006 | |
| JP | 2006332284 A | * | 12/2006 | .............. H01G 4/12 |
| JP | 2018-110212 A | | 7/2018 | |

* cited by examiner

FIG.7 PRIOR ART

MULTILAYER CERAMIC CAPACITOR

CROSS REFERENCE TO RELATED APPLICATIONS

This application claims the benefit of priority to Japanese Patent Application No. 2019-068291 filed on Mar. 29, 2019. The entire contents of this application are hereby incorporated herein by reference.

BACKGROUND OF THE INVENTION

1. Field of the Invention

The present invention relates to a multilayer ceramic capacitor, and more particularly to a multilayer ceramic capacitor in which moisture resistance, mechanical strength of an external electrode, and electrical connection reliability of the external electrode are improved.

2. Description of the Related Art

A multilayer ceramic capacitor is widely used in various electronic devices. In the multilayer ceramic capacitor, there is a demand for improvement of the moisture resistance.

Figure 7:
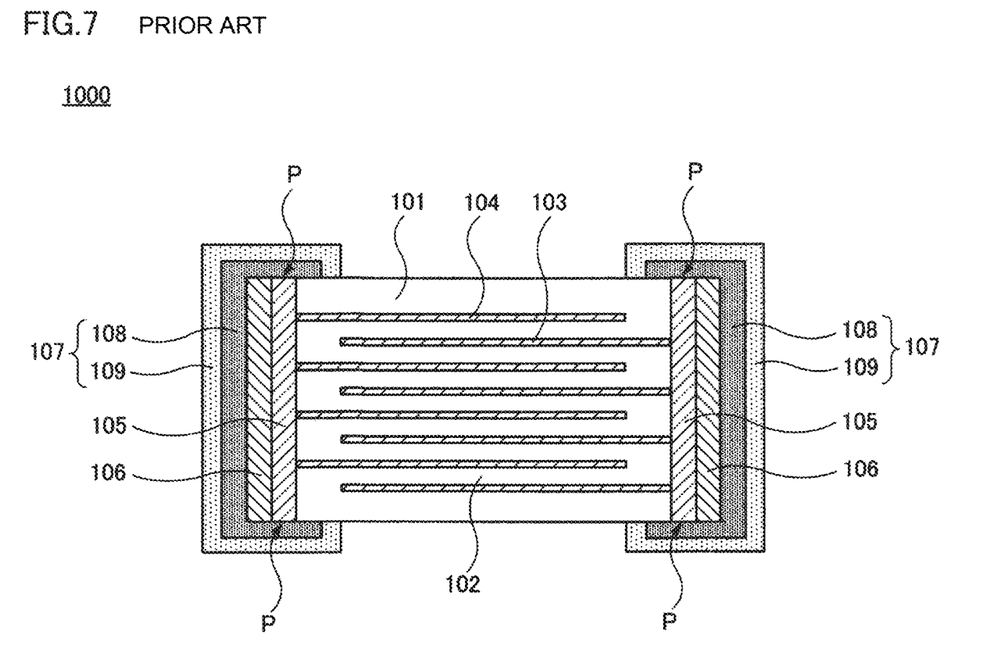
FIG. 7 is a sectional view illustrating a multilayer ceramic capacitor disclosed in Japanese Patent Laying-Open No. 2018-110212.

A multilayer ceramic capacitor with improved moisture resistance is disclosed in Japanese Patent Laid-Open No. 2018-110212. FIG. 7 illustrates a multilayer ceramic capacitor 1000 disclosed in Japanese Patent Laid-Open No. 2018-110212.

Multilayer ceramic capacitor 1000 includes a capacitive element 101 in which a plurality of ceramic layers 102, a plurality of first internal electrode layers 103, and a plurality of second internal electrode layers 104 are laminated.

A conductor layer 105 is formed on each of both end surfaces of capacitive element 101. First internal electrode layer 103 is electrically connected to conductor layer 105 formed on one end surface, and second internal electrode layer 104 is electrically connected to conductor layer 105 formed on the other end surface.

Conductor layer 105 is covered with an insulating portion 106 mainly including ceramic. Conductor layer 105 and insulating portion 106 are covered with an external electrode 107. External electrode 107 includes an underlayer external electrode layer 108 and a plating layer 109.

At the end of conductor layer 105 on a side surface side and a principal surface side of capacitive element 101, conductor layer 105 and underlayer external electrode layer 108 are joined together, and are electrically connected to each other. A portion in which conductor layer 105 and underlayer external electrode layer 108 are joined together and are electrically connected to each other is denoted by a reference numeral P.

The moisture resistance of multilayer ceramic capacitor 1000 is improved because insulating portion 106 mainly including ceramic is formed between conductor layer 105 and underlayer external electrode layer 108. That is, because insulating portion 106 is formed, moisture can be prevented from invading into an inside through a gap between ceramic layer 102 and first internal electrode layer 103 in the end surface of capacitive element 101 or a gap between ceramic layer 102 and second internal electrode layer 104.

Multilayer ceramic capacitor 1000 has a problem in that the mechanical strength of external electrode 107 is low because the bonding strength between conductor layer 105 and insulating portion 106 and the bonding strength between insulating portion 106 and underlayer external electrode layer 108 are low. That is, because the bonding strength between each of conductor layer 105 and underlayer external electrode layer 108 mainly including metal and insulating portion 106 mainly including ceramic is low, there is a possibility of peeling of capacitive element 101 from external electrode 107 by external force or a thermal cycle.

In multilayer ceramic capacitor 1000, because the bonding and the electrical connection between conductor layer 105 and underlayer external electrode layer 108 are performed only in the portion indicated by reference numeral P, when the thickness of conductor layer 105 decreases, there is a possibility that the bonding strength between conductor layer 105 and underlayer external electrode layer 108 becomes insufficient and the electrical connection between conductor layer 105 and underlayer external electrode layer 108 becomes insufficient or a wire is broken.

SUMMARY OF THE INVENTION

Preferred embodiments of the present invention provide multilayer ceramic capacitors in each of which moisture resistance, mechanical strength of an external electrode, and electrical connection reliability of the external electrode are improved.

A multilayer ceramic capacitor according to a preferred embodiment of the present invention includes a capacitive element including a plurality of laminated ceramic layers, a plurality of first internal electrode layers, and a plurality of second internal electrode layers, the capacitive element including a first principal surface and a second principal surface opposed to each other in a height direction, a first side surface and a second side surface opposed to each other in a width direction orthogonal or substantially orthogonal to the height direction, and a first end surface and a second end surface opposed to each other in a length direction orthogonal or substantially orthogonal to both the height direction and the width direction. The first internal electrode layer extends to the first end surface, and the second internal electrode layer extends to the second end surface, each of at least a portion of the first end surface and at least a portion of the second end surface is covered with a conductor layer, a portion of the conductor is covered with an insulating portion, at least a portion of the conductor layer and at least a portion of the insulating portion are covered with an underlayer external electrode layer in each of the end surfaces, and at least a portion of the underlayer external electrode layer is covered with a plating layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings.

Each of the preferred embodiments is merely an example of the present invention, and the present invention is not limited to the content of the preferred embodiments. It is also possible to combine the contents described in the preferred embodiments, and the contents of such cases are also included in the present invention. The drawings are used to assist understanding of the specification, sometimes the drawing is schematically drawn, and a ratio of dimensions between drawn components is not matched with a ratio of their dimensions described in the specification. Sometimes components described in the specification may be omitted in the drawings, or drawn with the number of components omitted.

First Preferred Embodiment

FIGS. 1, 2, 3A, 3B, 4A, and 4B illustrate a multilayer ceramic capacitor 100 according to a first preferred embodiment of the present invention. A height direction T, a width direction W, and a length direction L of multilayer ceramic capacitor 100 are illustrated in the drawings, and sometimes these directions are referred to in the following description.

Figure 1:
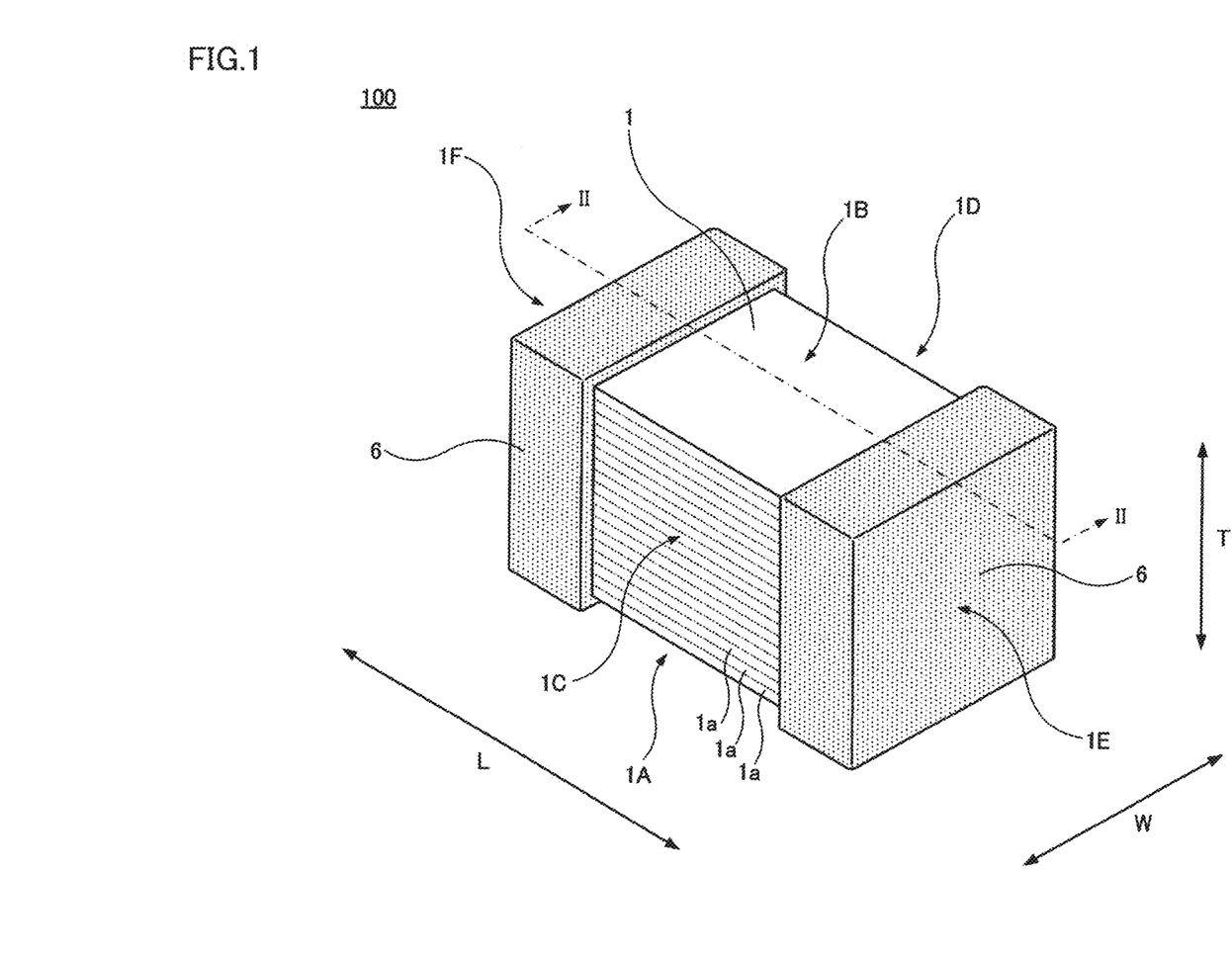
FIG. 1 is a perspective view illustrating a multilayer ceramic capacitor according to a first preferred embodiment of the present invention.
Figure 2:
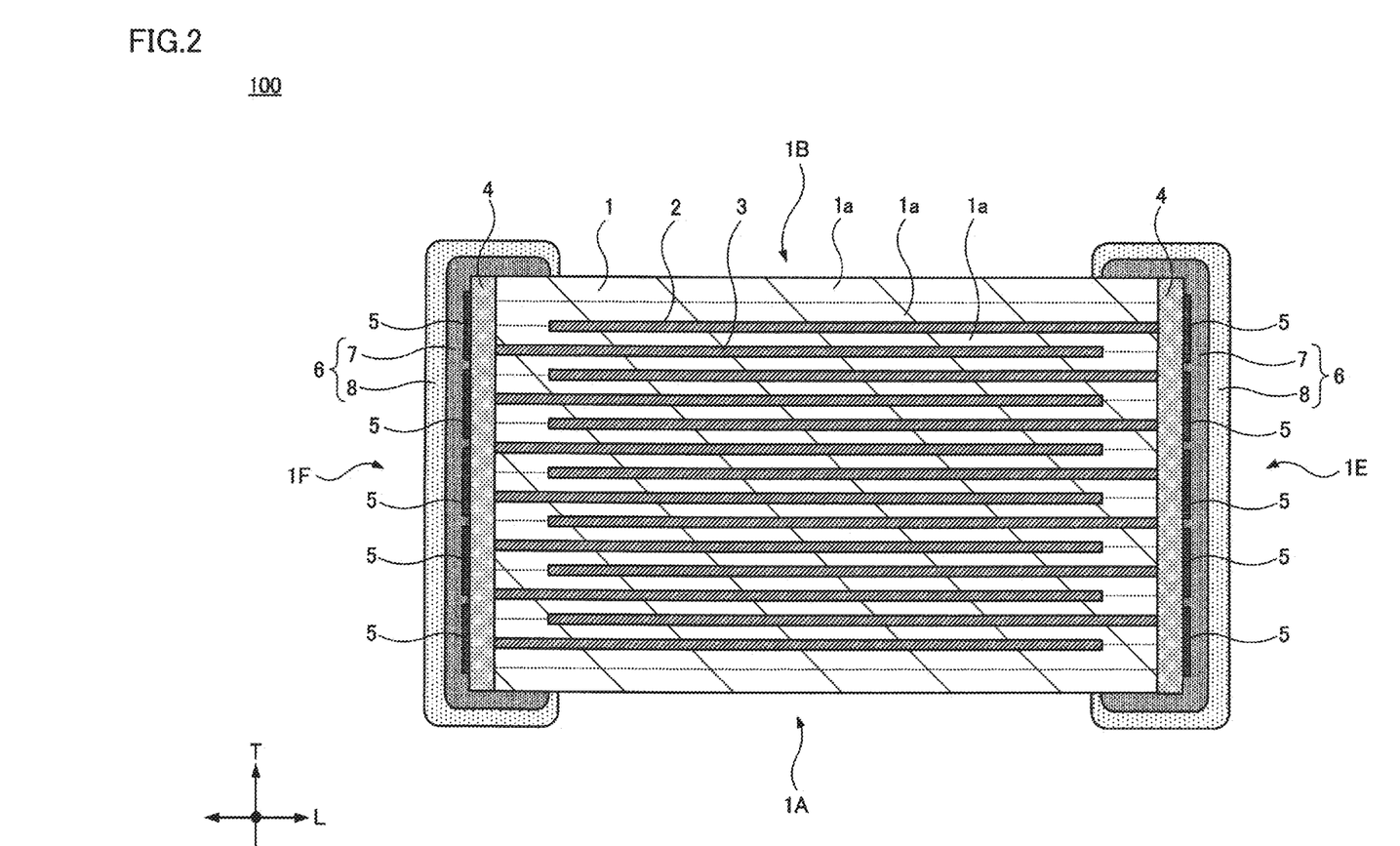
FIG. 2 is a sectional view taken along line II-II of the multilayer ceramic capacitor in FIG. 1.
Figure 3A:
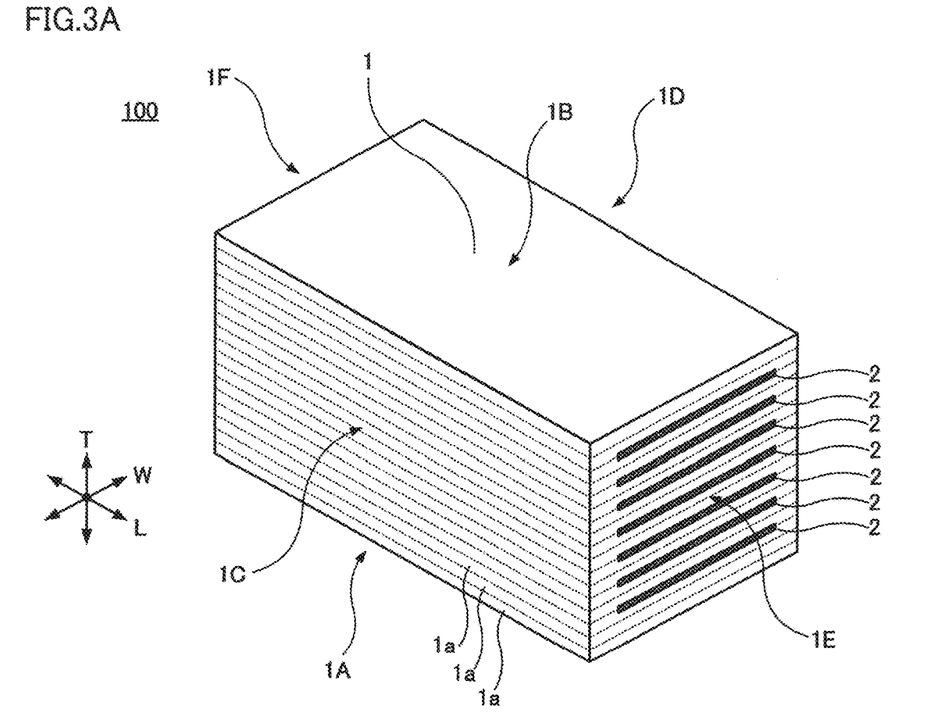
FIG. 3A is a first exploded perspective view illustrating the multilayer ceramic capacitor of the first preferred embodiment of the present invention.
Figure 3B:
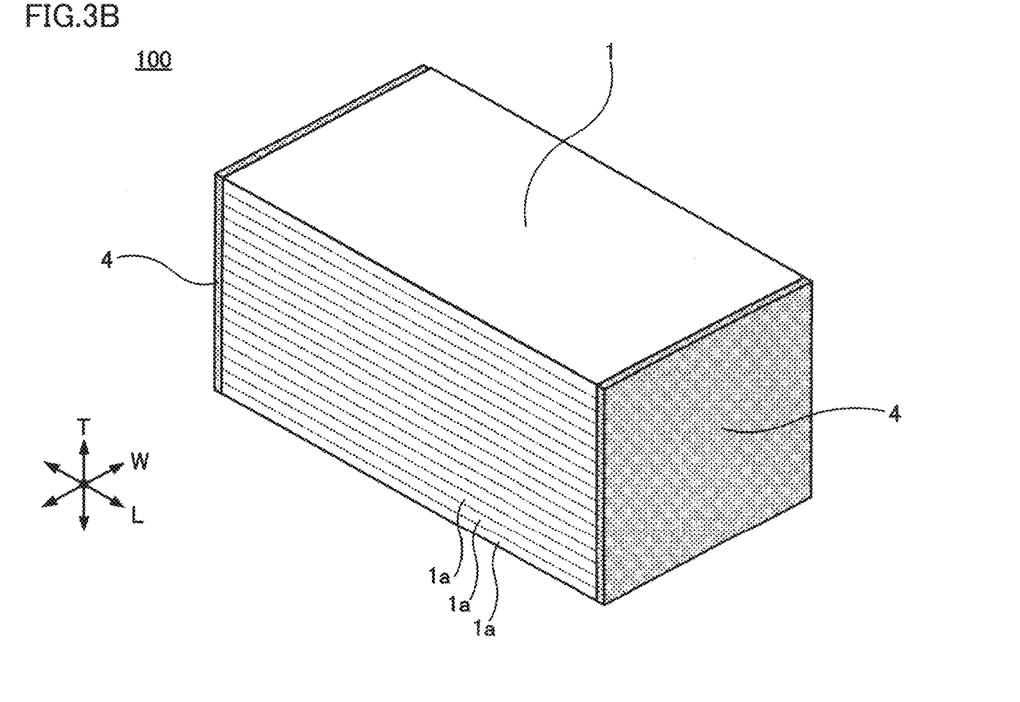
FIG. 3B is a second exploded perspective view illustrating the multilayer ceramic capacitor of the first preferred embodiment of the present invention.
Figure 4A:
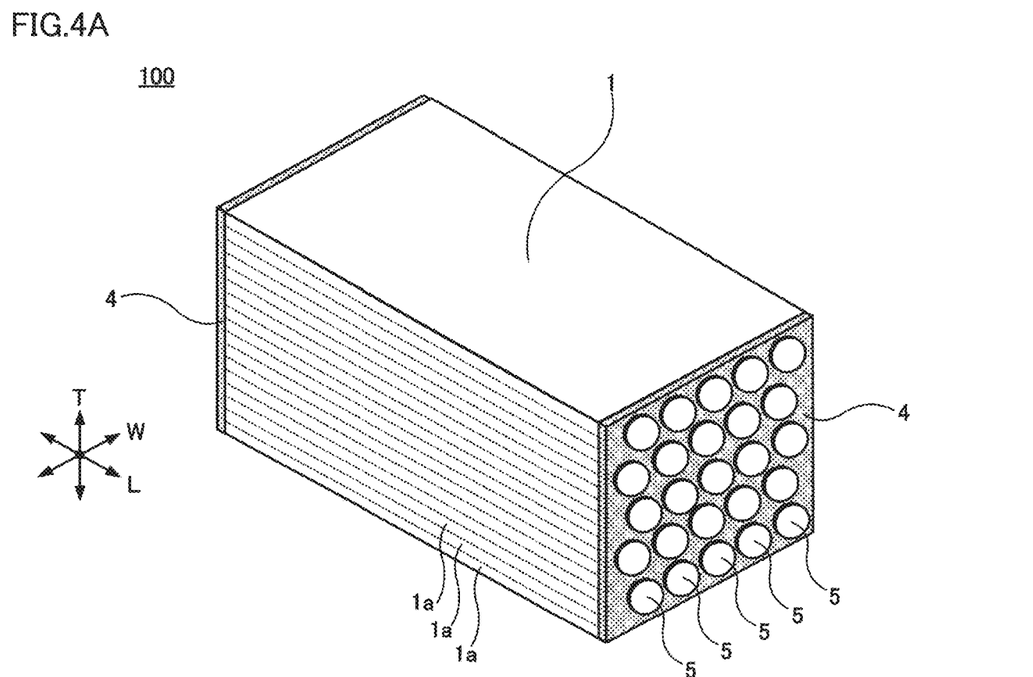
FIG. 4A is a third exploded perspective view illustrating the multilayer ceramic capacitor of the first preferred embodiment of the present invention.
Figure 4B:
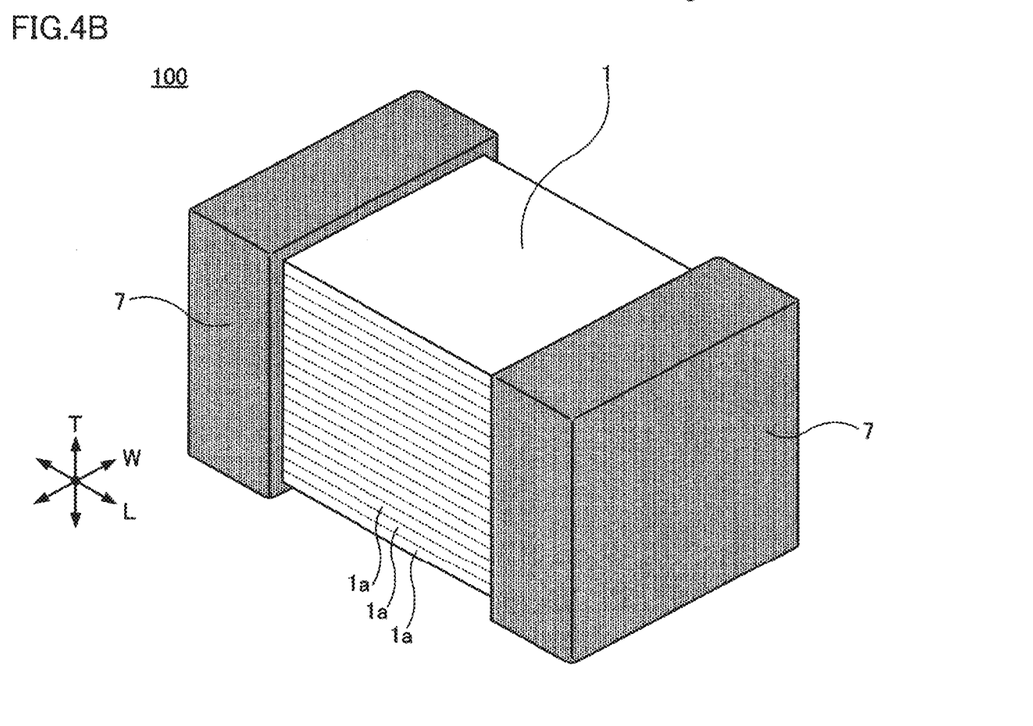
FIG. 4B is a fourth exploded perspective view illustrating the multilayer ceramic capacitor of the first preferred embodiment of the present invention.

FIG. 1 is a perspective view illustrating multilayer ceramic capacitor 100. FIG. 2 is a sectional view illustrating multilayer ceramic capacitor 100, and illustrates a portion II-II indicated by an arrow of an alternate long and short dash line in FIG. 1. FIGS. 3A, 3B, 4A, and 4B are first, second, third, and fourth exploded perspective views illustrating multilayer ceramic capacitor 100, respectively. FIG. 3A illustrates multilayer ceramic capacitor 100 in which a conductor layer 4, an insulating portion 5, and an external electrode 6 (underlayer external electrode layer 7, plating layer 8) (to be described later) are omitted. FIG. 3B illustrates multilayer ceramic capacitor 100 in which insulating portion 5 and external electrodes 6 are omitted. FIG. 4A illustrates multilayer ceramic capacitor 100 in which external electrodes 6 is omitted. FIG. 4B illustrates multilayer ceramic capacitor 100 in which plating layer 8 of external electrode 6 is omitted.

Multilayer ceramic capacitor 100 includes a capacitive element 1 in which a plurality of ceramic layers 1a, a plurality of first internal electrode layers 2, and a plurality of second internal electrode layers 3 are laminated. Capacitive element 1 has a rectangular or substantially rectangular parallelepiped shape, and includes a first principal surface 1A and a second principal surface 1B opposed to each other in height direction T, a first side surface 1C and a second side surface 1D opposed to each other in width direction W orthogonal or substantially orthogonal to height direction T, and a first end surface 1E and a second end surface 1F opposed to each other in length direction L orthogonal or substantially orthogonal to both height direction T and width direction W.

Any suitable material may be used for ceramic layer 1a. For example, a dielectric ceramic mainly including $BaTiO_3$ can be used as ceramic layer 1a. Alternatively, instead of $BaTiO_3$, a dielectric ceramic mainly including another material such as $CaTiO_3$, $SrTiO_3$, $CaZrO_3$, for example, may be used as ceramic layer 1a. Ceramic layer 1a has any suitable thickness. For example, the thickness preferably ranges from about 0.1 μm to about 1.0 μm.

Each of first internal electrode layer 2 and second internal electrode layer 3 may include any suitable main component. For example, Ni can preferably be used as the main component of each of first internal electrode layer 2 and second internal electrode layer 3. However, instead of Ni, other metals such as Pd, Ag, and Cu, for example, may be used as a main component of each of first internal electrode layer 2 and second internal electrode layer 3. An alloy of, for example, Ni, Pd, Ag, Cu, or the like and other metals may be used. Each of first internal electrode layer 2 and second internal electrode layer 3 has any suitable thickness. For example, the thickness may preferably range from about 0.1 μm to about 1.0 μm.

First internal electrode layer 2 extends to first end surface 1E, and second internal electrode layer 3 extends to second end surface 1F.

First end surface 1E and second end surface 1F are covered with conductor layer 4. First internal electrode layer 2 is electrically connected to conductor layer 4 in first end surface 1E, and second internal electrode layer 3 is electrically connected to conductor layer 4 in second end surface 1F. Although conductor layer 4 covers the entire or substantially the entire surface of each of first end surface 1E and second end surface 1F, conductor layer 4 does not need to cover the entire surface. In first end surface 1E, it is only necessary to cover at least first internal electrode layer 2 extending to first end surface 1E. In second end surface 1F, it is only necessary to cover at least second internal electrode layer 3 extending to second end surface 1F.

Conductor layer 4 may include any suitable main component. For example, Ni can be used as the main component of conductor layer 4. Alternatively, instead of Ni, other metals such as, for example, Pd, Ag, and Cu may be used as the main component of conductor layer 4. An alloy of, for example, Ni, Pd, Ag, Cu, and the like and other metals may be used. Conductor layer 4 has any suitable thickness. For example, the thickness may preferably range from about 0.3 μm to about 5.0 μm.

A portion of conductor layer 4 is covered with insulating portion 5. In the present preferred embodiment, insulating portion 5 preferably has a circular or substantially circular shape, and the plurality of insulating portions 5 are disposed on the surface of conductor layer 4 in a staggered manner. Insulating portion 5 has any suitable thickness. For example, the thickness may preferably range from about 0.3 μm to about 5.0 μm.

Preferably, a coverage of insulating portion 5 in a surface of conductor layer 4 is, for example, greater than or equal to about 20% and less than or equal to about 98%. When the coverage is less than about 20%, there is a possibility that an effect that the moisture resistance is improved by insulating portion 5 becomes insufficient. On the other hand, when the coverage exceeds about 98%, there is a possibility of decreasing bonding strength between conductor layer 4 and underlayer external electrode layer 7 (to be described later).

Using image analysis software, the coverage of insulating portion 5 in the surface of conductor layer 4 is measured from a photograph illustrating the end surfaces (first end surface 1E and second end surface 1F) of capacitive element 1 from which external electrode 6 is removed. More specifically, the measurement is performed by the following method.

First, external electrodes 6 (underlayer external electrode layer 7 and plating layer 8) are removed from the end surfaces (each of first end surface 1E and second end surface 1F) of capacitive element 1. The method for removing external electrode 6 includes a method for physically polishing and a method for chemically removing the external electrode, for example. In the method for physically polishing, external electrode 6 can be removed by fixing capacitive element 1 and horizontally polishing the end surface using polishing paper. In the method for chemically removing, for example, when underlayer external electrode layer 7 mainly includes Cu, external electrode 6 can be removed by immersion in a solution in which Cu is dissolved. By immersing the chip in a solder bath, external electrode 6 can be removed using the Cu bite.

Subsequently, a photograph of the end surface of capacitive element 1 from which external electrode 6 is removed is taken. The photograph of the end surface is taken while paying attention to the following. The photograph is taken using an optical microscope or a microscope. However, when insulating portion 5 and conductor layer 4 cannot be distinguished from each other in color, insulating portion 5 and conductor layer 4 can be distinguished from each other by mapping using a SEM (Scanning Electron Microscope) image (for example, detection of backscattered electrons) or EDX (Energy Dispersive X-ray spectrometry), WDX (Wavelength Dispersive X-ray spectrometry), and the like.

After the photograph in which insulating portion 5 and conductor layer 4 can be distinguished from each other is prepared, binarization processing is performed using image analysis software, and a proportion between insulating portion 5 and conductor layer 4 is calculated based on an area ratio. As described above, the coverage of insulating portion 5 in the surface of conductor layer 4 can be measured.

Insulating portion 5 is made of any suitable material. However, in the present preferred embodiment, insulating portion 5 preferably mainly includes ceramic, for example. Although a kind of the ceramic is arbitrary, for example, the same material as ceramic layer 1a can be used as a main component of insulating portion 5.

External electrodes 6 are provided on first end surface 1E and second end surface 1F of capacitive element 1. External electrode 6 includes an underlayer external electrode layer 7 and a plating layer 8. Each of external electrodes 6 has a cap shape, and extends from each of first principal surface 1A and second principal surface 1B to each of first side surface 1C and second side surface 1D and each of first end surface 1E and second end surface 1F.

Conductor layer 4 and insulating portion 5 are covered with underlayer external electrode layer 7. The bonding strength between conductor layer 4 mainly including metal and insulating portion 5 mainly including ceramic and the bonding strength between insulating portion 5 mainly including ceramic and underlayer external electrode layer 7 mainly including metal are not very high. However, because conductor layer 4 mainly including metal and underlayer external electrode layer 7 mainly including metal are firmly bonded together through the gap between insulating portions 5, conductor layer 4, insulating portion 5, and underlayer external electrode layers 7 are firmly integrated with one another.

Underlayer external electrode layer 7 is made of any suitable material. For example, Cu and glass can be used as underlayer external electrode layer 7. However, other metals such as Ag and Ni, for example, may be used instead of Cu included in underlayer external electrode layer 7. An alloy of, for example, Cu, Ag, Ni or the like included in underlayer external electrode layer 7 and other metals may be used. Underlayer external electrode layer 7 may not include glass. Underlayer external electrode layer 7 has any suitable thickness. For example, the thickness may preferably range from about 2 μm to about 100 μm.

Underlayer external electrode layer 7 is covered with plating layer 8. The material and the number of plating layers 8 are arbitrary. For example, plating layer 8 may have a two-layer structure in which a first layer is defined by a Ni plating film and a second layer is defined by a Sn plating film. However, in FIG. 2, plating layer 8 is illustrated as a single layer for convenience. Each of the first layer and the second layer of plating layer 8 has any suitable thickness. For example, the thickness may preferably range from about 0.1 μm to about 5.0 μm.

As described above, external electrode 6 includes underlayer external electrode layer 7 and plating layer 8.

In multilayer ceramic capacitor 100 of the present preferred embodiment, insulating portion 5 mainly including ceramic is provided between conductor layer 4 and underlayer external electrode layer 7, so that the moisture resistance is improved. That is, the formation of insulating portion 5 prevents the invasion of the moisture into the inside through the gap between ceramic layer 1a and first internal electrode layer 2 in first end surface 1E of capacitive element 1 or the gap between ceramic layer 1a and second internal electrode layer 3 in second end surface 1F of capacitive element 1.

In multilayer ceramic capacitor 100, insulating portion 5 is provided between conductor layer 4 and underlayer external electrode layer 7. However, because conductor layer 4 and underlayer external electrode layer 7 are firmly bonded together through the gap between insulating portions 5, conductor layer 4, insulating portion 5, and underlayer external electrode layer 7 are firmly integrated with one another. For this reason, in multilayer ceramic capacitor 100, the mechanical strength of external electrode 6 is high, and external electrode 6 is unlikely to peel from capacitive element 1.

In multilayer ceramic capacitor 100, conductor layer 4 and underlayer external electrode layer 7 are bonded together by a surface through the gap between insulating portions 5, and conductor layer 4 and underlayer external electrode layer 7 is electrically connected to each other, so that electrical connection reliability is high even when the thickness of conductor layer 4 is small. That is, for example, in multilayer ceramic capacitor 1000 disclosed in Japanese Patent Laying-Open No. 2018-110212 in FIG. 7, sometimes the electrical connection between conductor layer 105 and underlayer external electrode layer 108 becomes insufficient in a portion indicated by a reference numeral P when the thickness of conductor layer 105 decreases. On the other hand, in multilayer ceramic capacitor 100, conductor layer and underlayer external electrode layer 7 are electrically connected to each other satisfactorily even when the thickness of conductor layer 4 is small. For example, in multilayer ceramic capacitor 100, even when the thickness of conductor layer 4 is less than or equal to about 5.0 μm, conductor layer 4 and underlayer external electrode layer 7 are satisfactorily electrically connected to each other.

The glass included in underlayer external electrode layer 7 is added to improve the bonding strength with another member. However, in general, when a content of glass increases, conductivity of underlayer external electrode layer 7 decreases although the bonding strength with another member increases. However, in multilayer ceramic capacitor 100, as described above, because conductor layer 4 and underlayer external electrode layer 7 are firmly bonded together by the surface through the gap between insulating portions 5, there is no problem even when underlayer external electrode layer 7 includes a small content of glass. In multilayer ceramic capacitor 100, even when the content of glass of underlayer external electrode layer 7 is, for example, less than or equal to about 40 percent by volume, underlayer external electrode layer 7 is satisfactorily bonded to each of conductor layer 4 and insulating portion 5. When the content of glass of underlayer external electrode layer 7 is, for example, less than or equal to about 40 percent by volume, underlayer external electrode layer 7 has the sufficient conductivity.

In multilayer ceramic capacitor 100, preferably the same kind of ceramic as the ceramic included in ceramic layer 1a or the same kind of ceramic as the ceramic included in insulating portion 5 is added to conductor layer 4 as a common material. In this case, the bonding strength between capacitive element 1 and conductor layer 4 and the bonding strength between conductor layer 4 and insulating portion 5 can be improved.

For example, multilayer ceramic capacitor 100 of the first preferred embodiment can be manufactured by the following method.

First, dielectric ceramic powder, a binder resin, a solvent, and the like are prepared, and wet-mixed to produce ceramic slurry.

Subsequently, the ceramic slurry is applied on the carrier film in a sheet shape using, for example, a die coater, a gravure coater, a microgravure coater, or the like, and dried to prepare a ceramic green sheet.

Subsequently, previously-prepared conductive paste is printed in a desired pattern shape in order to form first internal electrode layer 2 or second internal electrode layer 3 on the principal surface of the predetermined ceramic green sheet. The conductive paste is not printed on the ceramic green sheet constituting a protective layer.

Subsequently, the ceramic green sheets are laminated in predetermined order, and integrated by heating and pressing to form the unbaked capacitive element.

Subsequently, a Ni sheet is prepared in order to form conductor layer 4. Specifically, first, Ni powder, a binder resin, a solvent, and the like are prepared, and wet-mixed to produce Ni slurry.

Subsequently, the Ni slurry is applied on a carrier film in the form of a sheet using, for example, a die coater, a gravure coater, a microgravure coater, or the like, and dried to prepare a Ni sheet.

Subsequently, each of both end surfaces of the unbaked capacitive element is pressed against the Ni sheet, and the Ni sheet is caused to adhere to the end surface of the unbaked capacitive element.

Subsequently, a ceramic slurry is prepared in order to form insulating portion 5. Specifically, first, ceramic powder, a binder resin, a solvent, and the like are prepared, and wet-mixed to prepare ceramic slurry.

Subsequently, the prepared ceramic slurry is applied in a desired shape to the surface of the Ni sheet adhered to each of both end surfaces of the unbaked capacitive element by, for example, an inkjet method.

Subsequently, the unbaked capacitive element with the Ni sheet adhered to the end surface and the ceramic slurry applied to the surface of the Ni sheet is baked with a predetermined profile to complete capacitive element 1. At this point, the conductive paste printed on the principal surface of the ceramic green sheet is simultaneously baked, and the plurality of first internal electrode layers 2 and the plurality of second internal electrode layers 3 are formed in capacitive element 1. The Ni sheet is simultaneously baked, and conductor layer 4 is formed on each of both end surfaces of capacitive element 1. The ceramic slurry applied to the surface of the Ni sheet is simultaneously baked, and insulating portion 5 is formed on the surface of conductor layer 4.

The unbaked capacitive elements are usually baked in batches. At this point, the Ni sheets of the adjacent unbaked capacitive elements are prevented from sticking to each other by the ceramic slurry applied to the surface of the Ni sheet.

Subsequently, in order to form underlayer external electrode layer 7 on capacitive element 1 in which conductor layer 4 and insulating portion 5 are provided, the conductive paste is applied to both of the ends of capacitive element 1 in which conductor layer 4 and insulating portion 5 are provided. Specifically, each of both ends of capacitive element 1 in which conductor layer 4 and insulating portion 5 are provided is immersed in a bath in which the conductive paste is put.

Subsequently, capacitive element 1 in which conductor layer 4 and insulating portion 5 are provided, the conductive paste being applied to both ends of capacitive element 1, is heated at a predetermined temperature, and the conductive paste is baked to form underlayer external electrode layer 7 at both ends of capacitive element 1 in which conductor layer 4 and insulating portion are provided.

Subsequently, plating layer 8 is formed on the surface of underlayer external electrode layer 7 by, for example, electrolytic plating, and external electrode 6 is completed. Consequently, multilayer ceramic capacitor 100 of the first preferred embodiment is completed.

Second Preferred Embodiment

Figure 5:
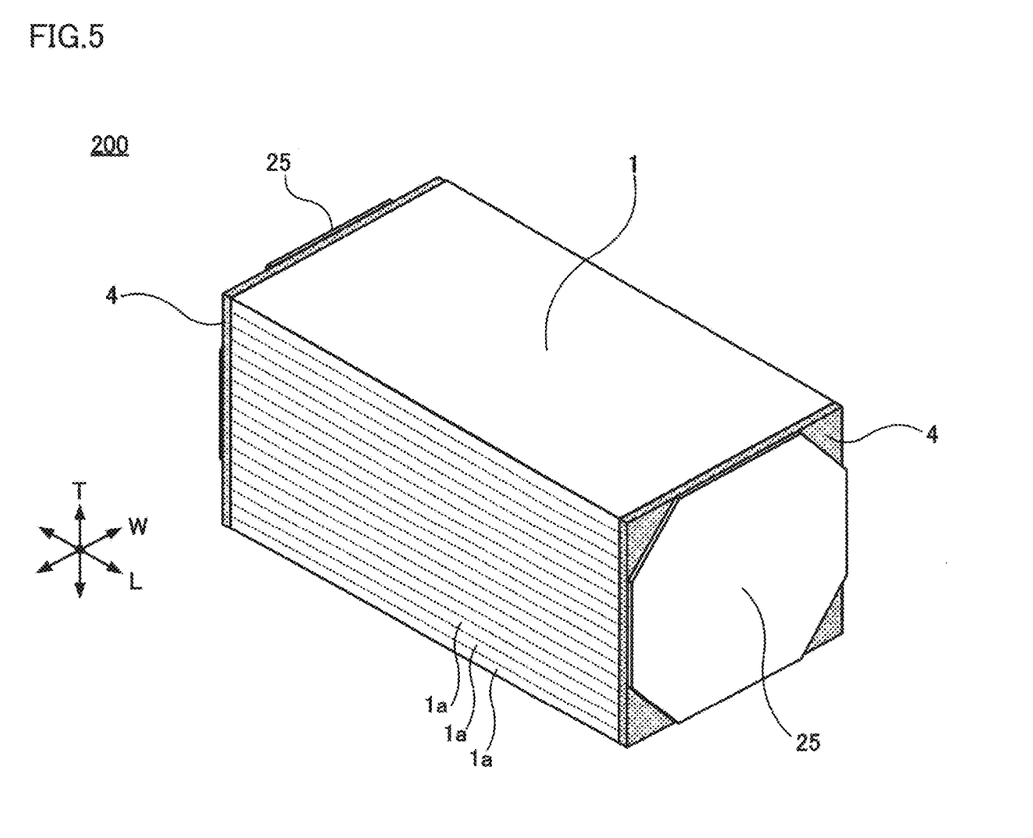
FIG. 5 is an exploded perspective view illustrating a multilayer ceramic capacitor according to a second preferred embodiment of the present invention.

FIG. 5 illustrates a multilayer ceramic capacitor 200 according to a second preferred embodiment of the present invention. FIG. 5 is an exploded perspective view illustrating multilayer ceramic capacitor 200, and illustrates a state in which external electrode 6 (underlayer external electrode layer 7, plating layer 8) is omitted.

In multilayer ceramic capacitor 200 of the second preferred embodiment, a portion of the configuration of multilayer ceramic capacitor 100 of the first preferred embodiment is changed. Specifically, in multilayer ceramic capacitor 100, conductor layer 4 is covered with the plurality of circular insulating portions 5. On the other hand, in multilayer ceramic capacitor 200, conductor layer 4 is covered with an insulating portion 25 having a large area. Insulating portion 25 has a shape in which four corners of conductor layer 4 are cut out. Other configurations of multilayer ceramic capacitor 200 are the same or substantially the same as those of multilayer ceramic capacitor 100.

In multilayer ceramic capacitor 200, conductor layer 4 and underlayer external electrode layer 7 are firmly bonded together in the cut portion. In the cut portion, conductor layer and underlayer external electrode layer 7 is electrically connected to each other.

Third Preferred Embodiment

Figure 6:
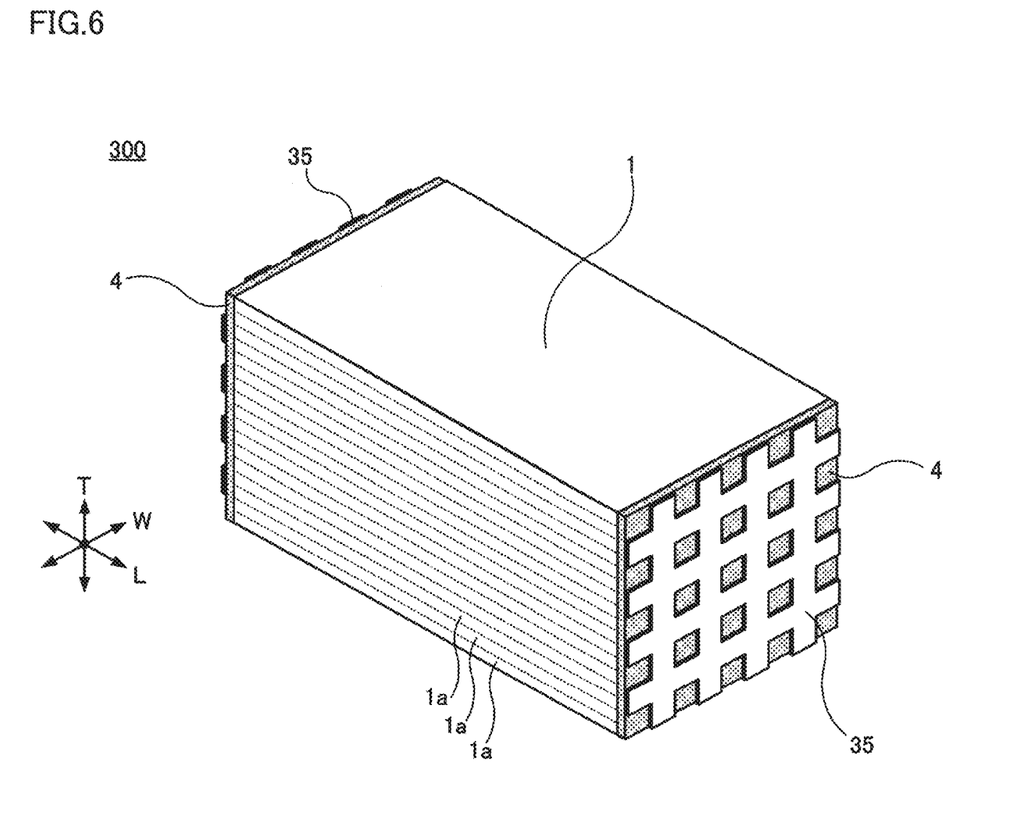
FIG. 6 is an exploded perspective view illustrating a multilayer ceramic capacitor according to a third preferred embodiment of the present invention.

FIG. 6 illustrates a multilayer ceramic capacitor 300 according to a third preferred embodiment of the present invention. FIG. 6 is an exploded perspective view illustrating multilayer ceramic capacitor 300, and illustrates a state in which external electrode 6 (underlayer external electrode layer 7, plating layer 8) is omitted.

In multilayer ceramic capacitor 300 of the third preferred embodiment, a portion of the configuration of multilayer ceramic capacitor 100 of the first preferred embodiment is changed. Specifically, in multilayer ceramic capacitor 100, conductor layer 4 is covered with the plurality of circular insulating portions 5. On the other hand, in multilayer ceramic capacitor 300, conductor layer 4 is covered with a lattice-shaped insulating portion 35. Other configurations of multilayer ceramic capacitor 300 are the same or substantially the same as those of multilayer ceramic capacitor 100.

In multilayer ceramic capacitor 300, conductor layer 4 and underlayer external electrode layer 7 are firmly bonded together in a portion of conductor layer 4 in which a window-shaped insulating portion formed in lattice-shaped insulating portion 35 is not formed. In the cut portion, conductor layer 4 and underlayer external electrode layer 7 is electrically connected to each other.

Multilayer ceramic capacitors 100, 200, 300 of the first to third preferred embodiments are described above. However, the present invention is not limited to the contents described above, and various changes can be made according to the gist of the invention.

For example, in the above-described preferred embodiments, conductor layer 4 includes one layer. Alternatively, conductor layer 4 may include a plurality of layers. For example, conductor layer 4 may include a first layer including metal (such as Ni) and ceramic and a second layer including metal.

In the above-described preferred embodiments, conductor layer 4 is defined by the Ni sheet. Alternatively, instead of the Ni sheet, a Pd sheet, an Ag sheet, a Cu sheet, or the like, for example, may be used for conductor layer 4.

Further, in the above-described preferred embodiments, conductor layer 4 is formed by causing the metal sheet (Ni sheet) to adhere to the end surface of the unbaked capacitive element. Alternatively, a conductive paste may be applied to the end surface of the unbaked capacitive element to form conductor layer 4.

In the above-described preferred embodiments, after the metal sheet (Ni sheet) adheres to the end surface of the unbaked capacitive element, the ceramic slurry is applied to the surface of the metal sheet by the inkjet method, for example, in order to form insulating portion 5. Alternatively, the ceramic slurry may previously be printed on the surface of the metal sheet before the metal sheet is caused to adhere to the end surface of the unbaked capacitive element.

In the above-described preferred embodiments, the ceramic slurry is partially applied to the surface of the metal sheet (Ni sheet) to form insulating portion 5. Alternatively, the ceramic slurry may be applied to the entire or substantially the entire surface of the metal sheet, and the ceramic slurry may be shrunk by heat during the baking to partially form insulating portion 5 on the surface of conductor layer 4.

In the above-described preferred embodiments, external electrode 6 has a cap shape so as to extend from first end surface 1E and second end surface 1F to each of first principal surface 1A and second principal surface 1B and each of first side surface 1C and second side surface 1D. However, it is only necessary for external electrodes 6 to extend to at least first end surface 1E and second end surface 1F.

In a multilayer ceramic capacitor according to a preferred embodiment of the present invention, preferably the insulating portion is dispersed on the surface of the conductor layer. In this case, the conductor layer and the underlayer external electrode layer are bonded together in the gap between the plurality of insulating portions.

Preferably, the insulating portion has a shape in which the four corners are cut off in each of the first end surface and the second end surface. In this case, the conductor layer and the underlayer external electrode layer are bonded together at the four corners.

Preferably, the coverage of the insulating portion in the surface of the conductor layer is greater than or equal to about 20% and less than or equal to about 98%, for example. When the coverage is less than about 20%, there is a possibility that the effect that the moisture resistance is improved by the insulating portion becomes insufficient. On the other hand, when the coverage exceeds about 98%, there is a possibility of decreasing bonding strength between the conductor layer and the underlayer external electrode layer.

Preferably, the coverage of the insulating portion in the surface of the conductor layer is greater than or equal to about 30% and less than or equal to about 75%, for example. When the coverage is greater than or equal to about 30%, the sufficient moisture resistance can be obtained by the insulating portion. When the coverage is less than or equal to about 75%, the bonding strength between the conductor layer and the underlayer external electrode layer becomes sufficiently large.

For example, the insulating portion preferably mainly includes ceramic.

Preferably, the conductor layer includes ceramic. In this case, the bonding strength between the capacitive element and the conductor layer or the bonding strength between the conductor layer and the insulating portion can be improved.

The thickness of the conductor layer may preferably be less than or equal to about 5.0 μm, for example. This is because even when the thickness is less than or equal to about 5.0 μm, the conductor layer and the underlayer external electrode layer are electrically connected to each other satisfactorily.

Preferably, the underlayer external electrode layer includes glass. In this case, the bonding strength between the underlayer external electrode layer and another member can be improved. In this case, preferably a percentage content of the glass is, for example, less than or equal to about 40 percent by volume. This is because the conductor layer and the underlayer external electrode layer are satisfactorily bonded to together through the gap between the insulating portions even when the percentage content of the glass is less than or equal to about 40 percent by volume. This is because the underlayer external electrode layer has good conductivity when the percentage content of the glass is less than or equal to about 40 percent by volume.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a capacitive element including a plurality of ceramic layers, a plurality of first internal electrode layers, and a plurality of second internal electrode layers that are laminated, the capacitive element including a first principal surface and a second principal surface opposed to each other in a height direction, a first side surface and a second side surface opposed to each other in a width direction orthogonal or substantially orthogonal to the height direction, and a first end surface and a second end surface opposed to each other in a length direction orthogonal or substantially orthogonal to both the height direction and the width direction; wherein
the first internal electrode layer extends to the first end surface, and the second internal electrode layer extends to the second end surface;
each of at least a portion of the first end surface and at least a portion of the second end surface is covered with a conductor layer;
a portion of the conductor layer is covered with an insulating portion only in each of the first end surface and the second end surface;
when viewed in the length direction, a portion of the conductor layer is exposed from the insulating portion in each of the first end surface and the second end surface;
at least a portion of the conductor layer and at least a portion of the insulating portion are covered with an underlayer external electrode layer in each of the first end surface and the second end surface;
in each of the first end surface and the second end surface, the insulating portion is located only at an interface between the portion of the conductor layer and the underlayer external electrode layer; and
at least a portion of the underlayer external electrode layer is directly covered with a plating layer.

2. The multilayer ceramic capacitor according to claim 1, wherein the insulating portion is dispersed on a surface of the conductor layer.

3. The multilayer ceramic capacitor according to claim 1, wherein the insulating portion has a shape in which four corners are cut off on each of the first end surface and the second end surface.

4. The multilayer ceramic capacitor according to claim 1, wherein a coverage of the insulating portion on a surface of the conductor layer is greater than or equal to about 20% and less than or equal to about 98%.

5. The multilayer ceramic capacitor according to claim 4, wherein the coverage of the insulating portion on the surface of the conductor layer is greater than or equal to about 30% and less than or equal to about 75%.

6. The multilayer ceramic capacitor according to claim 1, wherein the insulating portion mainly includes ceramic.

7. The multilayer ceramic capacitor according to claim 1, wherein the conductor layer includes ceramic.

8. The multilayer ceramic capacitor according to claim 1, wherein the conductor layer has a thickness less than or equal to about 5.0 µm.

9. The multilayer ceramic capacitor according to claim 1, wherein the underlayer external electrode layer includes glass.

10. The multilayer ceramic capacitor according to claim 9, wherein a percentage content of the glass in the underlayer external electrode layer is less than or equal to about 40 percent by volume.

11. The multilayer ceramic capacitor according to claim 1, wherein each of the plurality of ceramic layers mainly includes $BaTiO_3$.

12. The multilayer ceramic capacitor according to claim 1, wherein a thickness of each of the plurality of ceramic layers is about 0.1 µm to about 1.0 µm.

13. The multilayer ceramic capacitor according to claim 1, wherein each of the plurality of first internal electrode layers and each of the plurality of second internal electrode layers includes Ni as a main component.

14. The multilayer ceramic capacitor according to claim 1, wherein each of the plurality of first internal electrode layers and each of the plurality of second internal electrode layers has a thickness of about 0.1 µm to about 1.0 µm.

15. The multilayer ceramic capacitor according to claim 1, wherein the conductor layer includes Ni as a main component.

16. The multilayer ceramic capacitor according to claim 1, wherein the conductor layer has a thickness of about 0.3 µm to about 5.0 µm.

17. The multilayer ceramic capacitor according to claim 1, wherein a plurality of the insulating portions are disposed on a surface of the conductor layer in a staggered manner.

18. The multilayer ceramic capacitor according to claim 17, wherein each of the plurality of insulating portions has a circular or substantially circular shape.

19. The multilayer ceramic capacitor according to claim 1, wherein the insulating portion has a thickness of about 0.3 µm to about 5.0 µm.

20. The multilayer ceramic capacitor according to claim 1, wherein the insulating portion has a lattice shape.

* * * * *